UNITED STATES PATENT OFFICE.

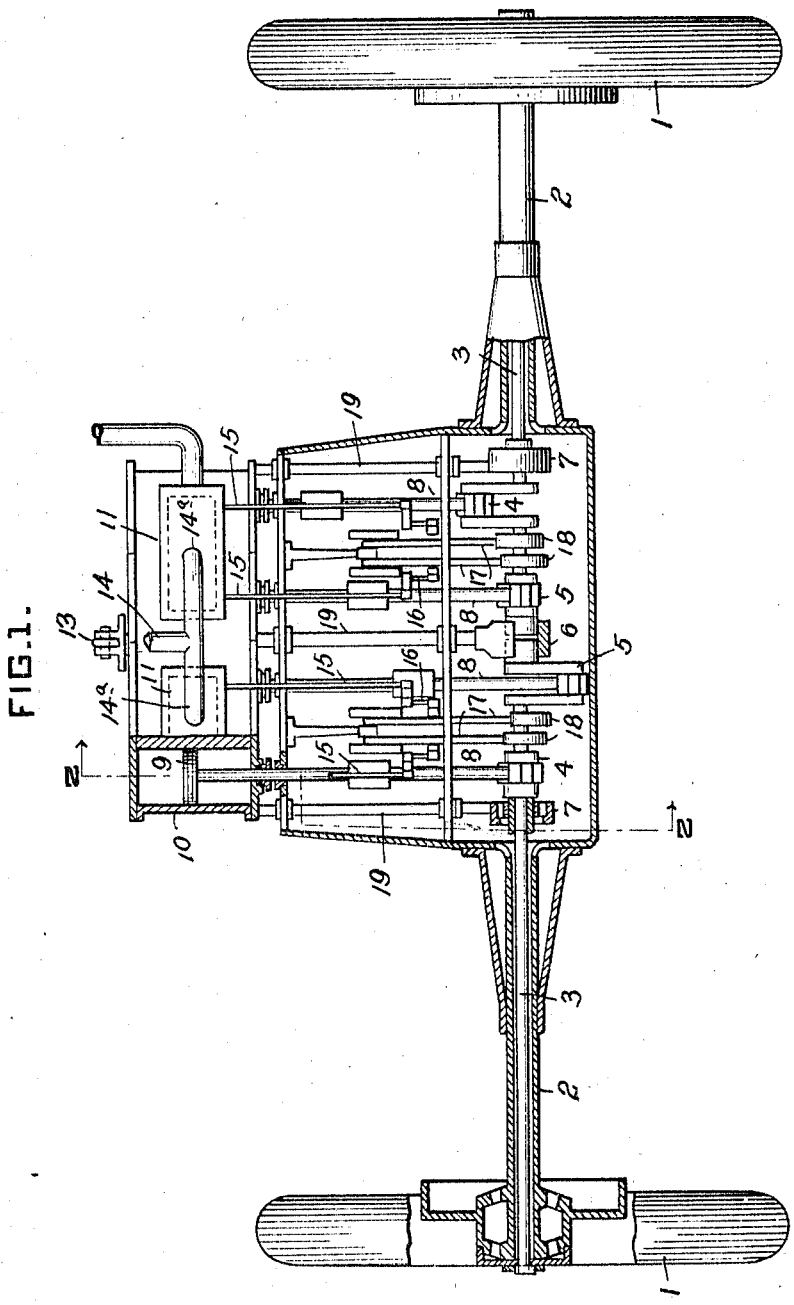

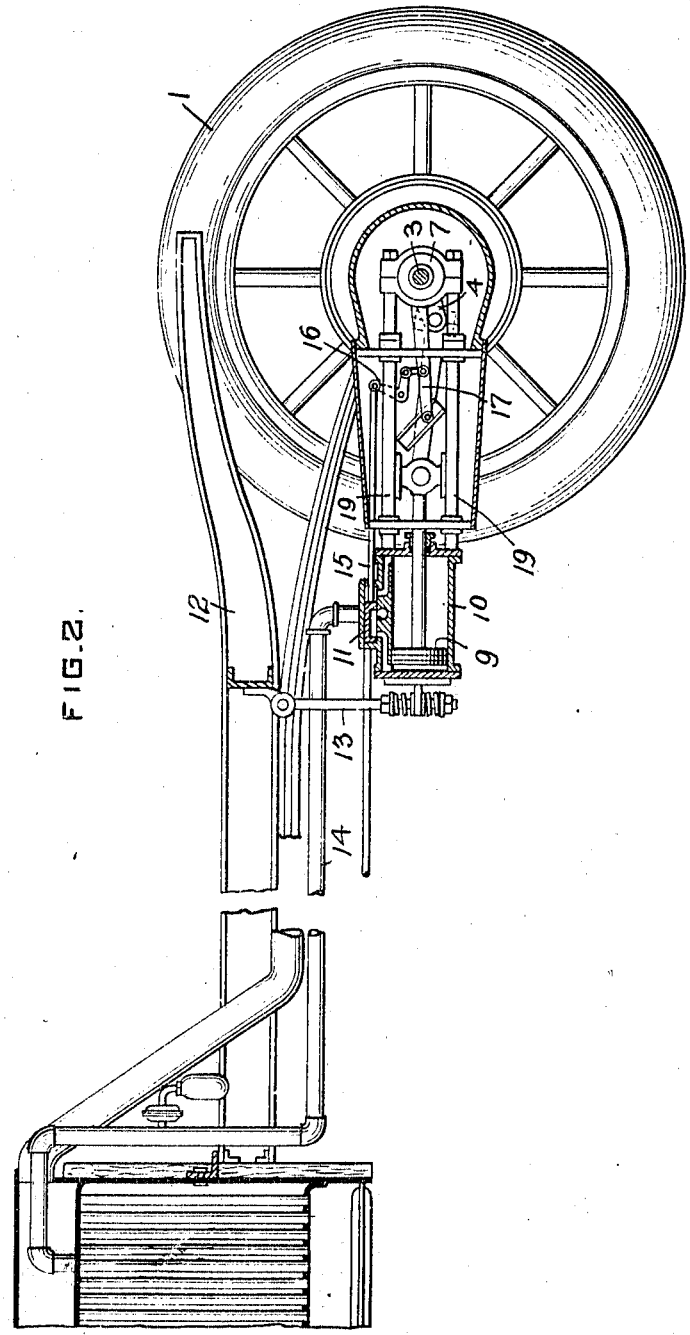

DUNCAN MACDONALD, OF PITTSBURGH, PENNSYLVANIA.

AUTOMOBILE DRIVING MECHANISM.

1,314,528. Specification of Letters Patent. Patented Sept. 2, 1919.

Application filed March 10, 1919. Serial No. 281,595.

*To all whom it may concern:*

Be it known that I, DUNCAN MACDONALD, a citizen of the United States, and a resident of Pittsburgh, in the county of Allegheny and State of Pennsylvania, have made a new and useful Invention in Automobile Driving Mechanism, of which the following is a specification.

The object of my invention is to provide a flexible and efficient means for driving automobiles and I accomplish this by the particular means described herein.

In the drawings attached and forming a part of this application, Figure 1 is partly a plan view and partly a horizontal section showing an automobile rear axle and wheels with power plant and housing as embodied in my invention and described below and Fig. 2 is a section on line 2—2 of Fig. 1.

Each rear wheel 1 is mounted on an axle tube 2 containing the full floating axle 3 which is formed in part as a crank shaft having off-set connecting rod bearings 4 and 5 and which is divided at the center of the car forming two axle portions having a common journal bearing 6 and individual journal bearings 7. The offset portions of the axle crank shaft are set at right angles to each other and each is turned by its respective connecting rod 8 attached to piston 9 operated by steam pressure in cylinder 10 which is one of four cast *en bloc* and integral with the steam chests 11. The chest and cylinders are pivotally supported from the automobile frame 12 by a single hanger 13. Steam from the boiler is supplied through pipes 14 and 14ª to steam chests 11 and its distribution to cylinders 10 is controlled by sliding valves of usual type each operated by rod 15, bell crank 16 and lever 17 which is mounted on eccentric 18. To avoid radiation and condensation the steam chest is illustrated as composed of two units with pipes 14ª supplying each respectively. This is a more practical method than having one large chest feeding all valves and a single live steam supply. But the principle of the operation in the two designs is identical.

Rods 19 space cylinder and shaft housing and maintain alinement of shaft bearings 6 and 7.

It is apparent that the right wheel is driven by the right pair of cylinders and the left wheel by the left pair of cylinders. As the right crank shaft axle is separate from the left crank shaft axle there will be no torque between these members caused by variations in the speed of the respective wheels due to irregularities of the roadway or to a circular path traveled by the automobile. The increased resistance of the slower moving wheel against the pistons driving it diverts a proportional amount of steam to the pistons driving the opposite wheel. In other words the equalized steam pressure in the steam chest functions the same as the ordinary differential gears which are commonly used in automobile construction.

All bearings may be plain, as shown, or of babbitted ball or roller type and their number may be increased. Although I have indicated four cylinders, two, six or other even number may be substituted without departing from the scope of my invention.

I claim:

1. In an automobile, traction wheels mounted on independent crank shaft axles each of which is driven by a plurality of connecting rods, piston rods, pistons and cylinders, and a housing rigidly connected to said cylinders and inclosing said axles and connecting rods and provided with openings for said piston rods.

2. In an automobile, a frame, traction wheels, a driving mechanism comprising a multi-cylinder unit, pistons and connecting rods driving independent crank shaft axles, a housing inclosing said rods and axles rigidly connected to said unit and supported at two points by said wheels, and a swinging, third point support from said frame to said unit.

3. In an automobile, a frame, a pair of traction wheels, a plurality of cylinders integrally connected, pistons and connecting rods driving a crank shaft forming an axle, and a housing inclosing said axle and connecting rods and provided with openings for the passage of said piston rods; said housing and said cylinders with inclosed parts forming a unitary power plant having a three point support from said frame and wheels.

4. In an automobile, a driving mechanism comprising a multi-cylinder unit flexibly supported from the automobile frame, pistons and connecting rods driven from said unit and operatively connected to separate crank shaft axles on which traction wheels are mounted, and means adapted to hold said axles alined and spaced from said unit and provided with bearings for said axles.

5. In an automobile, a pair of traction wheels independently mounted on separate alined axles having their inner ends formed into crank shafts, a housing for said axles provided with an integral extension for inclosing connecting rods and crossheads and adapted to be secured to and support a multi-cylinder driving unit for said crank shaft axles.

6. In an automobile, a driving mechanism comprising a multi-cylinder unit flexibly supported from the automobile frame, pistons operating therein, connecting rods driving a pair of crankshaft axles on which traction wheels are mounted, a housing for said axles, and members secured to said housing adapted to maintain the relative position of said axles with each other and with said unit.

In testimony whereof, I have hereunto subscribed my name this 4th day of March, 1919.

DUNCAN MACDONALD.